(12) United States Patent
Li et al.

(10) Patent No.: US 12,214,556 B2
(45) Date of Patent: Feb. 4, 2025

(54) SPACE ASSEMBLY SYSTEM BASED ON FUSION OF ON-ORBIT ADDITIVE MANUFACTURING AND GROUND-BASED LAUNCH

(71) Applicant: Xiangtan University, Xiangtan (CN)

(72) Inventors: Mingfu Li, Xiangtan (CN); Zhenyu Liu, Xiangtan (CN); Linling Li, Xiangtan (CN); Wenquan Zhao, Xiangtan (CN)

(73) Assignee: Xiangtan University, Xiangtan (CN)

( * ) Notice: Subject to any disclaimer, the term of this patent is extended or adjusted under 35 U.S.C. 154(b) by 122 days.

(21) Appl. No.: 18/324,565

(22) Filed: May 26, 2023

(65) Prior Publication Data

US 2023/0382054 A1   Nov. 30, 2023

(30) Foreign Application Priority Data

May 30, 2022  (CN) .......................... 202210603887.8

(51) Int. Cl.
  *B29C 64/393*  (2017.01)
  *B29C 64/20*  (2017.01)
  *B33Y 30/00*  (2015.01)
  *B33Y 50/02*  (2015.01)

(52) U.S. Cl.
  CPC ............ *B29C 64/393* (2017.08); *B29C 64/20* (2017.08); *B33Y 30/00* (2014.12); *B33Y 50/02* (2014.12)

(58) Field of Classification Search
  None
  See application file for complete search history.

(56) References Cited

U.S. PATENT DOCUMENTS

| 2018/0136633 A1* | 5/2018 | Small | ................... G06Q 30/018 |
| 2022/0009162 A1* | 1/2022 | Ballard | ................ B29C 64/106 |

* cited by examiner

*Primary Examiner* — Yung-Sheng M Tsui
(74) *Attorney, Agent, or Firm* — AVEK IP, LLC

(57) ABSTRACT

Some embodiments of the disclosure disclose a space assembly system based on fusion of on-orbit additive manufacturing and ground-based launch. In some examples, an operator establishes a space manufacturing center to achieve on-orbit manufacturing of spacecraft structural components and assembles the components manufactured on orbit with spacecraft enabling modules launched from the ground to form a target spacecraft. The system includes a physical subsystem, a digital twin subsystem, and a communication subsystem. The physical subsystem includes a control unit, a communication unit, a sensor unit, an imaging and positioning device, a data storage unit, a data processing unit, an additive manufacturing unit, a space robot unit, and a raw material bin. The digital twin subsystem remotely monitors the physical subsystem. The communication subsystem establishes a connection between the physical subsystem and the digital twin subsystem and a connection between all units and devices of the physical subsystem.

5 Claims, No Drawings

SPACE ASSEMBLY SYSTEM BASED ON FUSION OF ON-ORBIT ADDITIVE MANUFACTURING AND GROUND-BASED LAUNCH

CROSS REFERENCE TO RELATED APPLICATIONS

This patent application claims priority to Chinese Patent Application Number 202210603887.8, filed on May 30, 2022, the disclosure of which is incorporated by reference herein in its entirety.

FIELD OF THE DISCLOSURE

The disclosure relates generally to the field of space on-orbit manufacturing and assembly. More specifically, the disclosure relates to space assembly systems based on fusion of on-orbit additive manufacturing and ground-based launch.

BACKGROUND

With the human cognition of space and the development of related technologies, space activities are no longer limited to manned space flight, space station residence and other near-earth orbits. In space exploration missions planned by the United States, Europe, Russia, and China, future space exploration missions mainly feature "deep space and long time", which is followed by thorny problems such as how to perform spacecraft/space base on-orbit maintenance and expansion and low-cost rapid deployment of spacecraft. Currently, an international space station is implemented usually by manufacturing finished spacecraft on the ground, and launching a launch vehicle or a cargo spacecraft to carry the finished spacecraft to space, to meet requirements of a spacecraft deployment mission. Such a deployment not only has a long cycle and high costs, but also has certain launch risks. On the one hand, a spacecraft needs to bear an impact of 10-20 times of gravity acceleration during the launch process, which has high requirements on strength of a mechanical structure and material of the spacecraft, leading to an increase in launch and manufacturing costs. However, the spacecraft operates in a "vacuum+microgravity" environment, and its own mechanical structure and material do not need very high strength. On the other hand, for a long term, the spacecraft can only be a relatively small light machine manufactured on the ground because the launch vehicle can only carry articles with a certain size and weight. In the future, when human beings perform "deep space and long time" space exploration missions, the deployment of launching launch vehicles or cargo spacecraft at a high frequency from the ground to carry finished spacecraft will be difficult to meet requirements of spacecraft deployment in terms of timeliness, cost, etc. Manufacturing a spacecraft with more functions that breaks through the bottleneck of spacecraft size and weight and has more complex spatial and geometric configurations according to actual demands will provide effective logistics support for performing "deep space and long time" space exploration activities.

Additive manufacturing (three-dimensional (3D) printing) technology is considered as the most advantageous space manufacturing technology at present because the technology enables a digital model into an actual structural component to meet the demand of "ready-to-build and ready-to-use". The National Aeronautics and Space Administration (NASA) regards space additive manufacturing technology as a strategic key technology to support manned landing on Mars and other deep space exploration missions. Organizations such as NASA and the European Space Agency have drawn up a roadmap of space additive manufacturing, and made clear the important position of space additive manufacturing technology in space exploration activities. In order to initially enable the forming ability of space plastics and metal parts, NASA has deployed a number of pre-research projects. For the space additive manufacturing technology of composite materials, NASA, in cooperation with Made In Space, has successfully completed the forming test of a plastic 3D printer by a fused deposition modeling (FDM) process on the international space station, and started commercial operation.

Space on-orbit assembly technology is an important way to deploy spacecraft, and is of great significance to promote the development of large-scale high-performance spacecraft. In the early 1990s, researchers at NASA Langley Research Center began to develop a space truss structure assembly system based on a telerobot, to assemble a truss structure with a diameter of 8 m, which includes 12 panels and 102 pillars. Subsequently, many research institutions and personnel devoted themselves to related research of a fully autonomous space robot system. In 2012, Defense Advanced Research Projects Agency (DARPA) of the US Department of Defense launched the Phoenix project, which envisaged launching modular "cell stars" into a geostationary orbit and using space robots to repair, replace and upgrade spacecraft components. In addition, DARPA launched the robotic servicing of geosynchronous satellites (RSGS), will build space robots to maintain synchronous orbit satellites for independent replacement and repair of damaged hardware, and plans to expand the application of the space robots in on-orbit assembly. In July 2015, with the support of DARPA in the United States, Space Systems Loral (SSL) launched the "Dragonfly" project to assemble geostationary orbit communication satellites, focusing on research on on-orbit assembly and reconstruction of large-scale radio-frequency reflectors of satellites. In February 2020, NASA merged the Dragonfly project with the on-orbit refueling Restore-L project, and named it On-Orbit Servicing, Assembly & Manufacturing mission-1 (OSAM-1), which is scheduled to launch in 2023.

With the increasingly urgent demand for the construction of large space platforms and infrastructure, such as space stations, space telescopes, large communication antennas, space solar power stations, on-orbit refueling stations, deep space exploration transfer stations, and extraterrestrial bases, which represent China's scientific and technological strength, the development of China's independent space additive manufacturing and space on-orbit assembly technology has important strategic leadership. As one of the strategic key technologies of a spacecraft on-orbit maintenance system, space additive manufacturing technology will become an indispensable means of on-orbit maintenance and function expansion of future spacecraft by developing on-orbit manufacturing capabilities, establishing space manufacturing centers and realizing on-orbit manufacturing with device parts and functional structures on the basis of future spacecraft, and the space additive manufacturing technology combined with the on-orbit assembly technology will become an important technical guarantee for deep space exploration and space utilization in the future.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a space assembly system based on fusion of on-orbit additive manufacturing and ground-based launch, including a physical subsystem, a digital twin subsystem, and a communication subsystem.

The physical subsystem includes an additive manufacturing unit, a space robot unit, a raw material bin, a control unit, a communication unit, a sensor unit, an imaging and positioning device, a data storage unit, and a data processing unit.

Further, the additive manufacturing unit includes at least an additive manufacturing device configured to perform an additive manufacturing and printing task.

Further, the space robot unit includes at least one multifunctional robot, and the multifunctional robot is internally provided with a terminal tool library, and performs a plurality of different tasks, including a detection task, an assembly task, and a transportation and positioning task.

Further, the raw material bin is configured to store and manage, in space, additive manufacturing consumables, spacecraft enabling modules with universal standard interfaces, cables with universal standard interfaces, and parts kits that are launched from the ground; as a server of a recycling system, the raw material bin provides a recycling service when receiving a recycling service request; the space enabling module is a special module designed and manufactured on the ground to meet a requirement of a specific space mission, and includes a propulsion module, an energy module, a storage module, a communication module, an observation module, and a connection module; the universal standard interface meets at least requirements of stable connection, electrothermal transmission, and data communication between modules.

Further, the control unit is configured to control the additive manufacturing unit and the space robot unit to perform a task.

Further, the communication unit is a physical basis of the communication subsystem, and is configured to enable real-time communication between all the units and devices of the physical subsystem.

Further, the sensor unit includes a state sensor, an observation sensor, and an environmental sensor, where the state sensor is one or a combination of an instant position sensor, an instant attitude sensor, a limit sensor, and an overload sensor, and is configured to provide working information and a fault diagnosis basis of each unit and device of the physical subsystem; the observation sensor includes a near infrared camera, a near infrared spectrometer, a near infrared imaging seamless spectrometer, and a fine guidance sensor, and is one or a combination thereof; the environmental sensor is one or a combination of a temperature sensor, a force sensor, a passive remote sensor, and a magnetic sensor, and is configured to monitor internal and external environments of each unit and device of the physical subsystem.

Further, the imaging and positioning device is one or a combination of a camera, radar, and a multi-band imaging device, and is configured to identify and obtain digital models and information of each unit and device of the physical subsystem, including geometric, structural, and pose information.

Further, the data storage unit is configured to store various data in the space assembly system based on fusion of on-orbit additive manufacturing and ground-based launch.

Further, the data processing unit generates a task sequence through calculation, and the task sequence includes a preparation stage task sequence, an assembly stage task sequence, an additive manufacturing unit printing sequence, and a robot unit assembly sequence; the data processing unit further integrates a digital twin of the physical subsystem into the digital twin subsystem.

In the space assembly system according to the disclosure, the digital twin subsystem includes a human-computer interaction interface and a three-dimensional simulation environment, the physical subsystem is detected and sensed by the imaging and positioning device, and a target is extracted from the physical subsystem to generate a virtual digital model, where the virtual digital model includes geometric and structural information; physical parameters of the target, including heat distribution, electromagnetic field distribution, centroid and moment of inertia, are obtained by the sensor unit; the physical parameters are added to the virtual digital model by the data processing unit to generate a digital twin of the target, and the digital twin is integrated into the three-dimensional simulation environment to display the digital twin in the three-dimensional simulation environment; data synchronization is performed by the communication subsystem to enable a one-to-one correspondence between the physical subsystem and the digital twin subsystem, to monitor the physical subsystem.

Further, the human-computer interaction interface is configured to display files sent by the physical subsystem, including the log information, the component test report, and the finished product test report; and the ground or space operator sends an instruction by the human-computer interaction interface to control the physical subsystem.

Further, the three-dimensional simulation environment is configured to visualize the digital twin of the physical subsystem, and the ground or space operator remotely monitors the physical subsystem by the three-dimensional simulation environment; remotely monitored content includes: device monitoring, operation and maintenance monitoring, task monitoring, energy monitoring, and production scheduling pre-determining.

Further, the device monitoring is to monitor an operation state of each unit and device, and analyze and pre-determine the operation state of each unit and device in real time; the operation and maintenance monitoring is to monitor a scheduling state of each unit and device, including: a task sequence accumulation state and reason, and an idle state and reason of each unit and device; the task monitoring is to monitor task sequence execution progress of each unit and device, and monitor the task sequence execution progress of each unit and device in real time; the energy monitoring is to monitor production consumption of the physical subsystem, and the production consumption includes: consumption of additive manufacturing consumables, consumption of spacecraft enabling modules, consumption of cables, consumption of parts kits, energy consumption, emission of pollutants, and a recycled quantity of unqualified components; and the production scheduling pre-determining is to pre-determine a capacity of the physical subsystem in a next unit time period according to data collected by the task monitoring, a time length of the unit time period is defined by the ground or space operator, and a type and quantity of raw materials needed in the next unit time period are generated.

In the space assembly system according to the disclosure, the communication subsystem establishes a connection between all units of the physical subsystem and a connection between the physical subsystem and the digital twin subsystem in at least one communication mode; the communication mode includes topic communication, parameter server communication, and service communication, where the topic communication includes a topic, a subscriber, and a publisher, where the publisher publishes the topic, the subscriber subscribes to the topic, and the topic communication is used in a data transmission scenario where continuous update and less logical processing are performed; the parameter server communication includes a parameter server, a parameter setter, and a parameter caller, where the parameter server is a public container configured to store and manage data, the parameter setter sets a parameter to the parameter server, the parameter caller obtains the parameter from the parameter server, and the parameter server communication is used in an application scenario where data sharing exists; and the service communication includes a service, a server, and a client, where the client sends a service request to the server, the server provides the service to the client, and the service communication is used in an application scenario where there is a requirement for real-time performance and certain logical processing is performed.

Optionally, an architecture of the communication subsystem is as follows: a communication mode between the physical subsystem and the digital twin subsystem is service communication, the data processing unit is a server, the digital twin subsystem is a client, and a service is two-way information transmission between the digital twin subsystem and the physical subsystem; a communication mode between the data processing unit and the control unit is parameter server communication, the data storage unit is a parameter server, the data processing unit is a parameter setter, and the control unit is a parameter caller; a communication mode between the data processing unit and the sensor unit is parameter server communication, the data storage unit is a parameter server, the sensor unit is a parameter setter, and the data processing unit is a parameter caller; a communication mode between the data processing unit and the imaging and positioning device is parameter server communication, the data storage unit is a parameter server, the imaging and positioning device is a parameter setter, and the data processing unit is a parameter caller; a communication mode between the control unit and the additive manufacturing unit is topic communication, a topic is a printing task sequence of the additive manufacturing unit, the control unit is a publisher, and the additive manufacturing unit is a subscriber; a communication mode between the control unit and the space robot unit is topic communication, a topic is an assembly task sequence, a transportation and positioning task sequence and a test task sequence, the control unit is a publisher, and the space robot unit is a subscriber; a communication mode between the raw material bin and the data processing unit is parameter server communication, the data storage unit is a parameter server, the raw material bin is a parameter setter, and the data processing unit is a parameter caller; and a communication mode between the space robot unit and the raw material bin is service communication, the raw material bin is a server, the space robot unit is a client, and a service is a raw material extracting service and a recycling service.

In the space assembly system according to the disclosure, for a new spacecraft production task, the following steps are included.

Step 1: performing, by the space assembly system, system self-check before a task instruction from a ground or space operator is received, and confirming that an operation state of the space assembly system is a normal operation state; performing, by the space assembly system, system initialization after the task instruction from the ground or space operator is received, and waiting for a next task instruction.

Step 2: generating, by the digital twin subsystem, a target spacecraft model based on a target spacecraft model inputted by the ground or space operator, and inputting the target spacecraft model into the data processing unit; and analyzing, by the data processing unit, the target spacecraft model and generating a task sequence, and storing the task sequence in the data storage unit, where the task sequence includes a preparation stage task sequence and an assembly stage task sequence.

Steps of generating the preparation stage task sequence are as follows:

Step 2a: accessing the data storage unit by the data processing unit to obtain inventory information of the raw material bin, and confirming inventory quantities of the additive manufacturing consumables, the spacecraft enabling modules, the cables and the parts kits; if the inventory quantity is insufficient, creating a corresponding type and quantity as log information, storing the log information in the data storage unit, sending the log information to the digital twin subsystem, and waiting for a subsequent instruction from the ground or space operator; and if the inventory quantity is sufficient, performing the next step.

Step 2b: generating a printing task sequence of the additive manufacturing unit, which includes the following steps.

Step 2b1: if a target printed piece is printed only by the additive manufacturing unit, defining the target printed piece as a simple printed piece, and going to step 2b2; and if the target printed piece needs embedding of other parts during printing, including any one or more of a spacecraft enabling module, a cable, a simple printed piece, and a parts kit, defining the target printed piece as a composite printed piece, and going to step 2b3.

Step 2b2: generating a task sequence of the simple printed piece.

Step 2b3: generating a task sequence of the composite printed piece, which includes the following steps.

Step 2b3a: slicing a three-dimensional model of the composite printed piece by the data processing unit to generate a slice file of the composite printed piece.

Step 2b3b: defining other parts to be embedded during printing, including a spacecraft enabling module, a cable, a simple printed piece and a parts kit, as objects to be embedded, scanning the slice file of the composite printed piece by the data processing unit, and marking action labels on an initial layer of the objects to be embedded.

Step 2b3c: generating, by the data processing unit, an instruction for controlling the multifunctional robot and the additive manufacture device, to assemble or place the objects to be embedded into a workpiece being printed; inserting an additive manufacturing device pause instruction, an additive manufacturing device pause time, a transportation and positioning instruction for the multifunctional robot, an assembly instruction for the multifunctional robot and a continued printing instruction for the additive manufacturing device at the marked action labels, respectively; defining the slice file of the composite printed piece with the instruction insertion completed as a preprocessed file.

Step 2b3d: converting the preprocessed file into a task sequence of the composite printed piece by the data processing unit.

Step 2c: generating a preparation stage task sequence of the space robot unit, which includes the following steps:

Step 2c1: generating a transportation and positioning task sequence, where the transportation and positioning task sequence is configured to control the multifunctional robot to grab components to be assembled, transport the components to be assembled to a designated spatial position, and fix spatial attitudes thereof; and the components to be assembled are a simple printed piece, a composite printed piece, a spacecraft enabling module, a cable and a parts kit required for assembling a target spacecraft.

Step 2c2: generating a component testing task sequence, where the component testing task sequence is configured to control the multifunctional robot to test the components to be assembled before assembly, and if a test result is unqualified, recycling unqualified components; and if the test result is qualified, performing the next step.

Steps of generating the assembly stage task sequence are as follows.

Step 2d: generating an assembly stage task sequence of the space robot unit, which includes the following steps.

Step 2d1: generating an assembly task sequence, where the assembly task sequence is configured to control the multifunctional robot to assemble the components to be assembled into a finished target spacecraft according to the target spacecraft model.

Step 2d2: generating a function testing task sequence, where the function testing task sequence is configured to control the multifunctional robot to perform function testing on the finished target spacecraft.

Step 3: accessing the data storage unit by the control unit to obtain the preparation stage task sequence; and controlling, by the control unit, the additive manufacturing unit and the space robot unit to execute the preparation stage task sequence, where steps of executing the preparation stage task sequence are as follows.

Step 3a: executing, by the additive manufacturing device, the task sequence of the simple printed piece to complete the preparation of the simple printed piece; and cooperatively executing, by the additive manufacturing device and the multifunctional robot, the task sequence of the composite printed piece to complete the preparation of the composite printed piece.

Step 3b: executing, by the multifunctional robot, the transportation and positioning task sequence to grab components to be assembled, transport the components to be assembled to a designated spatial position, and fix spatial attitudes thereof.

Step 3c: executing, by the multifunctional robot, the component testing task sequence to test the components to be assembled, creating a test result as a component test report, and storing the component test report in the data storage unit; if the test result is unqualified, recycling, by the multifunctional robot, unqualified components to the raw material bin, sending the component test report to the digital twin subsystem, and waiting for a subsequent instruction from the ground or space operator; and if the test result is qualified, performing the next step.

Step 4: accessing the data storage unit by the control unit to obtain the assembly stage task sequence; and controlling, by the control unit, the space robot unit to execute the assembly stage task sequence, where steps of executing the assembly stage task sequence are as follows.

Step 4a: executing, by the multifunctional robot, the assembly task sequence to assemble the components to be assembled into a finished target spacecraft according to the target spacecraft model.

Step 4b: executing, by the multifunctional robot, the function testing task sequence to perform function testing on the finished target spacecraft, creating a test result as a finished product test report, and storing the finished product test report in the data storage unit; if the test result is unqualified, sending the finished product test report to the digital twin subsystem, and waiting for a subsequent instruction from the ground or space operator; and if the test result is qualified, sending the finished product test report to the digital twin subsystem.

Step 5: completing, by the physical subsystem, a target spacecraft manufacturing task, and causing each unit and device to return to an initial state to wait for a next task.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The described embodiments are merely some rather than all of the embodiments of the disclosure. All other embodiments obtained by a person of ordinary skill in the art based on the embodiments of the disclosure without creative efforts shall fall within the protection scope of the disclosure.

A space assembly system based on fusion of on-orbit additive manufacturing and ground-based launch may include a physical subsystem, a digital twin subsystem, and a communication subsystem, where The physical subsystem may include an additive manufacturing unit, a space robot unit, a raw material bin, a control unit, a communication unit, a sensor unit, an imaging and positioning device, a data storage unit, and a data processing unit, where:

The additive manufacturing unit may include at least an additive manufacturing device configured to perform an additive manufacturing and printing task.

The space robot unit may include at least one multifunctional robot, and the multifunctional robot is internally provided with a terminal tool library, and performs a plurality of different tasks, including a detection task, an assembly task, and a transportation and positioning task.

The raw material bin is configured to store and manage, in space, additive manufacturing consumables, spacecraft enabling modules with universal standard interfaces, cables with universal standard interfaces, and parts kits that are launched from the ground; as a server of a recycling system, the raw material bin provides a recycling service when receiving a recycling service request; the space enabling module is a special module designed and manufactured on the ground to meet a requirement of a specific space mission, and may include a propulsion module, an energy module, a storage module, a communication module, an observation module, and a connection module; the universal standard interface meets at least requirements of stable connection, electrothermal transmission, and data communication between modules.

The control unit is configured to control the additive manufacturing unit and the space robot unit to perform a task.

The communication unit is a physical basis of the communication subsystem, and is configured to enable real-time communication between all the units and devices of the physical subsystem.

The sensor unit may include a state sensor, an observation sensor, and an environmental sensor, where the state sensor is one or a combination of an instant position sensor, an instant attitude sensor, a limit sensor, and an overload sensor, and is configured to provide working information and a fault diagnosis basis of each unit and device of the physical subsystem; the observation sensor may include a near infrared camera, a near infrared spectrometer, a near infrared imaging seamless spectrometer, and a fine guidance sensor, and is one or a combination thereof; the environmental sensor is one or a combination of a temperature sensor, a force sensor, a passive remote sensor, and a magnetic sensor, and is configured to monitor internal and external environments of each unit and device of the physical subsystem.

The imaging and positioning device is one or a combination of a camera, radar, and a multi-band imaging device, and is configured to identify and obtain digital models and information of each unit and device of the physical subsystem, including geometric, structural, and pose information.

The data storage unit is configured to store various data in the space assembly system based on fusion of on-orbit additive manufacturing and ground-based launch.

The data processing unit generates a task sequence through calculation, and the task sequence may include a preparation stage task sequence, an assembly stage task sequence, an additive manufacturing unit printing sequence, and a robot unit assembly sequence. the data processing unit further integrates a digital twin of the physical subsystem into the digital twin subsystem.

The digital twin subsystem may include a human-computer interaction interface and a three-dimensional simulation environment, the physical subsystem is detected and sensed by the imaging and positioning device, and a target is extracted from the physical subsystem to generate a virtual digital model, where the virtual digital model may include geometric and structural information; physical parameters of the target, including heat distribution, electromagnetic field distribution, centroid and moment of inertia, are obtained by the sensor unit; the physical parameters are added to the virtual digital model by the data processing unit to generate a digital twin of the target, and the digital twin is integrated into the three-dimensional simulation environment to display the digital twin in the three-dimensional simulation environment; data synchronization is performed by the communication subsystem to enable a one-to-one correspondence between the physical subsystem and the digital twin subsystem, to monitor the physical subsystem.

The human-computer interaction interface is configured to display files sent by the physical subsystem, including the log information, the component test report, and the finished product test report; and the ground or space operator sends an instruction by the human-computer interaction interface to control the physical subsystem.

The three-dimensional simulation environment is configured to visualize the digital twin of the physical subsystem, and the ground or space operator remotely monitors the physical subsystem by the three-dimensional simulation environment; remotely monitored content may include device monitoring, operation and maintenance monitoring, task monitoring, energy monitoring, and production scheduling pre-determining.

The device monitoring is to monitor an operation state of each unit and device, and analyze and pre-determine the operation state of each unit and device in real time.

The operation and maintenance monitoring is to monitor a scheduling state of each unit and device, including: a task sequence accumulation state and reason, and an idle state and reason of each unit and device.

The task monitoring is to monitor task sequence execution progress of each unit and device, and monitor the task sequence execution progress of each unit and device in real time.

The energy monitoring is to monitor production consumption of the physical subsystem, and the production consumption may include consumption of additive manufacturing consumables, consumption of spacecraft enabling modules, consumption of cables, consumption of parts kits, energy consumption, emission of pollutants, and a recycled quantity of unqualified components. and The production scheduling pre-determining is to pre-determine a capacity of the physical subsystem in a next unit time period according to data collected by the task monitoring, a time length of the unit time period is defined by the ground or space operator, and a type and quantity of raw materials needed in the next unit time period are generated.

The communication subsystem is configured to establish a connection between the physical subsystem and the digital twin subsystem and a connection between all units and devices of the physical subsystem. Optionally, three communication modes are defined: topic communication, parameter server communication, and service communication, where The topic communication includes a topic, a subscriber, and a publisher, where the publisher publishes the topic, the subscriber subscribes to the topic, and the topic communication is used in a data transmission scenario where continuous update and less logical processing are performed.

The parameter server communication includes a parameter server, a parameter setter, and a parameter caller, where the parameter server is a public container, data may be stored in the container, the parameter setter sets a parameter to the parameter server, the parameter caller obtains the parameter from the parameter server, and the parameter server communication is used in an application scenario where data sharing exists.

The service communication includes a service, a server, and a client, the client sends a service request to the server, the server provides the service to the client, and the service communication is used in an application scenario where there is a requirement for real-time performance and certain logical processing is performed.

Optionally, a communication mode between the physical subsystem and the digital twin subsystem is service communication, the data processing unit of the physical subsystem is a server, the digital twin subsystem is a client, and a service is real-time synchronization between a digital model in a digital virtual world and the physical subsystem.

The connection between all units of the physical subsystem are described as below.

Optionally, a communication mode between the physical subsystem and the digital twin subsystem is service communication, the data processing unit is a server, the digital twin subsystem is a client, and a service is two-way information transmission between the digital twin subsystem and the physical subsystem.

Optionally, a communication mode between the data processing unit and the control unit is parameter server communication, the data storage unit is a parameter server, the data processing unit is a parameter setter, and the control unit is a parameter caller.

Optionally, a communication mode between the data processing unit and the sensor unit is parameter server communication, the data storage unit is a parameter server, the sensor unit is a parameter setter, and the data processing unit is a parameter caller.

Optionally, a communication mode between the data processing unit and the imaging and positioning device is parameter server communication, the data storage unit is a parameter server, the imaging and positioning device is a parameter setter, and the data processing unit is a parameter caller.

Optionally, a communication mode between the control unit and the additive manufacturing unit is topic communication, a topic is a printing task sequence of the additive manufacturing unit, the control unit is a publisher, and the additive manufacturing unit is a subscriber.

Optionally, a communication mode between the control unit and the space robot unit is topic communication, a topic is an assembly task sequence, a transportation and positioning task sequence and a test task sequence, the control unit is a publisher, and the space robot unit is a subscriber.

Optionally, a communication mode between the raw material bin and the data processing unit is parameter server communication, the data storage unit is a parameter server, the raw material bin is a parameter setter, and the data processing unit is a parameter caller; and Optionally, a communication mode between the space robot unit and the raw material bin is service communication, the raw material bin is a server, the space robot unit is a client, and a service is a raw material extracting service and a recycling service.

Task content of an optional embodiment: The operator completes the printing of structural components of a target spacecraft and assembles the structural components into the target spacecraft by the space assembly system based on fusion of on-orbit additive manufacturing and ground-based launch according to the disclosure.

The workflow of the task of the optional embodiment may include the following steps.

Step 1: Perform, by the space assembly system, system self-check before a task instruction from a ground or space operator is received, and confirm that an operation state of the space assembly system is a normal operation state; and perform, by the space assembly system, system initialization after the task instruction from the ground or space operator is received, and wait for a next task instruction.

Step 2: Generate, by the digital twin subsystem, a target spacecraft model based on a target spacecraft model inputted by the ground or space operator, and input the target spacecraft model into the data processing unit; and analyze, by the data processing unit, the target spacecraft model and generate a task sequence, and store the task sequence in the data storage unit, where the task sequence may include a preparation stage task sequence and an assembly stage task sequence.

Steps of generating the preparation stage task sequence are as follows.

Step 2a: Access the data storage unit by the data processing unit to obtain inventory information of the raw material bin, and confirm inventory quantities of the additive manufacturing consumables, the spacecraft enabling modules, the cables and the parts kits; if the inventory quantity is insufficient, create a corresponding type and quantity as log information, store the log information in the data storage unit, send the log information to the digital twin subsystem, and wait for a subsequent instruction from the ground or space operator; and if the inventory quantity is sufficient, perform the next step.

Step 2b: Generate a printing task sequence of the additive manufacturing unit, which may include the following steps.

Step 2b1: If a target printed piece is printed only by the additive manufacturing unit, define the target printed piece as a simple printed piece, and go to step 2b2; and if the target printed piece needs embedding of other parts during printing, such as any one or more of a spacecraft enabling module, a cable, a simple printed piece, and a parts kit, define the target printed piece as a composite printed piece, and go to step 2b3.

Step 2b2: Generate a task sequence of the simple printed piece.

Step 2b3: Generate a task sequence of the composite printed piece, which may include the following steps.

Step 2b3a: Slice a three-dimensional model of the composite printed piece by the data processing unit to generate a slice file of the composite printed piece.

Step 2b3b: Define other parts to be embedded during printing, such as a spacecraft enabling module, a cable, a simple printed piece and a parts kit, as objects to be embedded, scan the slice file of the composite printed piece by the data processing unit, and mark action labels on an initial layer of the objects to be embedded.

Step 2b3c: Generate, by the data processing unit, an instruction for controlling the multifunctional robot and the additive manufacture device, to assemble or place the objects to be embedded into a workpiece being printed; insert an additive manufacturing device pause instruction, an additive manufacturing device pause time, a transportation and positioning instruction for the multifunctional robot, an assembly instruction for the multifunctional robot and a continued printing instruction for the additive manufacturing device at the marked action labels, respectively; and define the slice file of the composite printed piece with the instruction insertion completed as a preprocessed file.

Step 2b3d: Convert the preprocessed file into a task sequence of the composite printed piece by the data processing unit.

Step 2c: Generate a preparation stage task sequence of the space robot unit, which may include the following steps.

Step 2c1: Generate a transportation and positioning task sequence, where the transportation and positioning task sequence is configured to control the multifunctional robot to grab components to be assembled, transport the components to be assembled to a designated spatial position, and fix spatial attitudes thereof; and the components to be assembled are a simple printed piece, a composite printed piece, a spacecraft enabling module, a cable and a parts kit required for assembling a target spacecraft.

Step 2c2: Generate a component testing task sequence, where the component testing task sequence is configured to control the multifunctional robot to test the components to be assembled before assembly, and if a test result is unqualified, recycle unqualified components; and if the test result is qualified, perform the next step.

Steps of generating the assembly stage task sequence are as follows.

Step 2d: Generate an assembly stage task sequence of the space robot unit, which may include the following steps.

Step 2d1: Generate an assembly task sequence, where the assembly task sequence is configured to control the multifunctional robot to assemble the components to be assembled into a finished target spacecraft according to the target spacecraft model.

Step 2d2: Generate a function testing task sequence, where the function testing task sequence is configured to control the multifunctional robot to perform function testing on the finished target spacecraft.

Step 3: Access the data storage unit by the control unit to obtain the preparation stage task sequence; and control, by the control unit, the additive manufacturing unit and the space robot unit to execute the preparation stage task sequence, where steps of executing the preparation stage task sequence are as follows.

Step 3a: Execute, by the additive manufacturing device, the task sequence of the simple printed piece to complete the preparation of the simple printed piece; and cooperatively execute, by the additive manufacturing device and the multifunctional robot, the task sequence of the composite printed piece to complete the preparation of the composite printed piece.

Step 3b: Execute, by the multifunctional robot, the transportation and positioning task sequence to grab components to be assembled, transport the components to be assembled to a designated spatial position, and fix spatial attitudes thereof.

Step 3c: Execute, by the multifunctional robot, the component testing task sequence to test the components to be assembled, create a test result as a component test report, and store the component test report in the data storage unit; if the test result is unqualified, recycle, by the multifunctional robot, unqualified components to the raw material bin, send the component test report to the digital twin subsystem, and wait for a subsequent instruction from the ground or space operator; and if the test result is qualified, perform the next step.

Step 4: Access the data storage unit by the control unit to obtain the assembly stage task sequence; and control, by the control unit, the space robot unit to execute the assembly stage task sequence, where steps of executing the assembly stage task sequence are as follows.

Step 4a: Execute, by the multifunctional robot, the assembly task sequence to assemble the components to be assembled into a finished target spacecraft according to the target spacecraft model.

Step 4b: Execute, by the multifunctional robot, the function testing task sequence to perform function testing on the finished target spacecraft, create a test result as a finished product test report, and store the finished product test report in the data storage unit; if the test result is unqualified, send the finished product test report to the digital twin subsystem, and wait for a subsequent instruction from the ground or space operator; and if the test result is qualified, send the finished product test report to the digital twin subsystem.

Step 5: Complete, by the physical subsystem, a target spacecraft manufacturing task, and cause each unit and device to return to an initial state to wait for a next task.

The above embodiments are provided merely for describing the technical solutions of the disclosure, but not for limiting the disclosure. Although the disclosure is described in detail with reference to the above embodiments, a person of ordinary skill in the art should understand that he/she may still make modifications to the technical solutions described in the above embodiments or make equivalent replacements to some or all technical features thereof; and these modifications or replacements do not make the essence of the corresponding technical solution depart from the scope of the technical solutions of the embodiments of the disclosure, and shall fall within the scope of claims and description of the disclosure.

Various embodiments of the disclosure may have one or more of the following effects. In some embodiments, the disclosure may achieve on-orbit maintenance and expansion of a spacecraft and low-cost rapid deployment of the spacecraft. In other embodiments, the disclosure may achieve low-cost rapid deployment of a spacecraft.

Many different arrangements of the various components depicted, as well as components not shown, are possible without departing from the spirit and scope of the disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A space assembly system based on fusion of on-orbit additive manufacturing and ground-based launch, comprising a physical subsystem, a digital twin subsystem, and a communication subsystem, wherein:

the digital twin subsystem is configured to remotely monitor the physical subsystem and to enable a ground or space operator to receive information sent by the physical subsystem and to give an instruction to control the physical subsystem;

the communication subsystem is configured to establish a connection between each unit and device of the physical subsystem and a connection between the physical subsystem and the digital twin subsystem;

the physical subsystem comprises an additive manufacturing unit, a space robot unit, a raw material bin, a control unit, a communication unit, a sensor unit, an imaging and positioning device, a data storage unit, and a data processing unit, wherein:

the additive manufacturing unit comprises at least an additive manufacturing device configured to perform an additive manufacturing and printing task;

the space robot unit comprises at least one multifunctional robot, and the multifunctional robot is internally provided with a terminal tool library and is configured to perform at least one task selected from the group consisting of a detection task, an assembly task, and a transportation and positioning task;

the raw material bin is configured to store and manage additive manufacturing consumables, spacecraft enabling modules with universal standard interfaces, cables with universal standard interfaces, and parts kits launched from the ground;

the raw material bin is configured to provide a recycling service when receiving a recycling service request;

the space enabling module is a module designed and manufactured on the ground to meet a requirement of a specific space mission and the space enabling module comprises a propulsion module, an energy module, a storage module, a communication module, an observation module, and a connection module;

a universal standard interface is configured to meet at least one requirement selected from the group consisting of stable connection, electrothermal transmission, and data communication between modules;

the control unit is configured to control the additive manufacturing unit and the space robot unit;

the communication unit is a physical basis of the communication subsystem and is configured to help enable real-time communication between all units and devices of the physical subsystem;

the sensor unit comprises a state sensor, an observation sensor, and an environmental sensor, wherein the state sensor is one or a combination of an instant position sensor, an instant attitude sensor, a limit sensor, and an overload sensor, and is configured to provide working information and a fault diagnosis basis of each unit and device of the physical subsystem; the observation sensor comprises a near infrared camera, a near infrared spectrometer, a near infrared imaging seamless spectrometer, and a fine guidance sensor, and is one or a combination thereof; the environmental sensor is one or a combination of a temperature sensor, a force sensor, a passive remote sensor, and a magnetic sensor, and is configured to monitor internal and external environments of each unit and device of the physical subsystem;

the imaging and positioning device is one or a combination of a camera, radar, and a multi-band imaging device, and is configured to identify and obtain digital models and information of each unit and device of the physical subsystem, including geometric, structural, and pose information;

the data storage unit is configured to store various data in the space assembly system based on fusion of on-orbit additive manufacturing and ground-based launch;

the data processing unit is configured to generate a task sequence, the task sequence comprising a preparation stage task sequence, an assembly stage task sequence, an additive manufacturing unit printing sequence, and a robot unit assembly sequence; and the data processing unit is further configured to integrate a digital twin of the physical subsystem into the digital twin subsystem; and a spacecraft production task implemented by the space assembly system comprises following steps:

step 1: performing, by the space assembly system, system self-check before a task instruction from the ground or space operator is received, and confirming that an operation state of the space assembly system is in a normal operation state; performing, by the space assembly system, system initialization after the task instruction from the ground or space operator is received, and waiting for a next task instruction;

step 2: generating, by the digital twin subsystem, a target spacecraft model based on a target spacecraft model inputted by the ground or space operator, and inputting the target spacecraft model into the data processing unit; and analyzing, by the data processing unit, the target spacecraft model and generating a task sequence, and storing the task sequence in the data storage unit, wherein the task sequence comprises a preparation stage task sequence and an assembly stage task sequence, the preparation stage task sequence comprises:

step 2a: accessing the data storage unit, by the data processing unit, to obtain inventory information of the raw material bin, and confirming inventory quantities of the additive manufacturing consumables, the spacecraft enabling modules, the cables, and the parts kits; if the inventory quantity is insufficient, creating a corresponding type and quantity as log information, storing the log information in the data storage unit, sending the log information to the digital twin subsystem, and waiting for a subsequent instruction from the ground or space operator; and if the inventory quantity is sufficient, performing step 2b;

step 2b: generating a printing task sequence of the additive manufacturing unit, which comprises:

step 2b1: if a target printed piece is printed only by the additive manufacturing unit, defining the target printed piece as a simple printed piece, and going to step 2b2; and if the target printed piece needs embedding of other parts during printing, such as any one or more of a spacecraft enabling module, a cable, a simple printed piece, and a parts kit, defining the target printed piece as a composite printed piece, and going to step 2b3;

step 2b2: generating a task sequence of the simple printed piece; and step 2b3: generating a task sequence of the composite printed piece;

step 2c: generating a preparation stage task sequence of the space robot unit, which comprises:

step 2c1: generating a transportation and positioning task sequence, wherein the transportation and positioning task sequence is configured to control the multifunctional robot to grab components to be assembled, transport the components to be assembled to a designated spatial position, and fix spatial attitudes thereof; and the components to be assembled are a simple printed piece, a composite printed piece, a spacecraft enabling module, a cable, and a parts kit required for assembling a target spacecraft; and step 2c2: generating a component testing task sequence, wherein the component testing task sequence is configured to control the multifunctional robot to test the components to be assembled before assembly, if a test result is unqualified, recycling unqualified components, and if the test result is qualified, performing the next step; and the assembly stage task sequence comprises:

step 2d: generating an assembly stage task sequence of the space robot unit, which comprises:

step 2d1: generating an assembly task sequence, wherein the assembly task sequence is configured to control the multifunctional robot to assemble the components to be assembled into a finished target spacecraft according to the target spacecraft model; and step 2d2: generating a function testing task sequence, wherein the function testing task sequence is configured to control the multifunctional robot to perform function testing on the finished target spacecraft;

step 3: accessing the data storage unit by the control unit to obtain the preparation stage task sequence; and controlling, by the control unit, the additive manufacturing unit and the space robot unit to execute the preparation stage task sequence, which comprises:

step 3a: executing, by the additive manufacturing device, the task sequence of the simple printed piece to complete the preparation of the simple printed piece; and cooperatively executing, by the additive manufacturing device and the multifunctional robot, the task sequence of the composite printed piece to complete the preparation of the composite printed piece;

step 3b: executing, by the multifunctional robot, the transportation and positioning task sequence to grab components to be assembled, transport the components to be assembled to a designated spatial position, and fix spatial attitudes thereof; and step 3c: executing, by the multifunctional robot, the component testing task sequence to test the components to be assembled, creating a test result as a component test report, and storing the component test report in the data storage unit; if the test result is unqualified, recycling, by the multifunctional robot, unqualified components to the raw material bin, sending the component test report to the digital twin subsystem, and waiting for a subsequent instruction from the ground or space operator; and if the test result is qualified, performing step 4;

step 4: accessing the data storage unit by the control unit to obtain the assembly stage task sequence; and controlling, by the control unit, the space robot unit to execute the assembly stage task sequence, which comprises:

step 4a: executing, by the multifunctional robot, the assembly task sequence to assemble the components to be assembled into a finished target spacecraft according to the target spacecraft model; and step 4b: executing, by the multifunctional robot, the function testing task sequence to perform function testing on the finished target spacecraft, creating a test result as a finished product test report, and storing the finished product test report in the data storage unit; if the test result is unqualified, sending the finished product test report to the digital twin subsystem, and waiting for a subsequent instruction from the ground or space operator; and if the test result is qualified, sending the finished product test report to the digital twin subsystem; and step 5: completing, by the physical subsystem, a target spacecraft manufacturing task, and causing each unit and device to return to an initial state to wait for a next task.

2. The space assembly system according to claim 1, wherein the step 2b3 comprises:

step 2b3a: slicing a three-dimensional model of the composite printed piece by the data processing unit to generate a slice file of the composite printed piece;

step 2b3b: defining other parts to be embedded during printing, the other parts comprising a spacecraft enabling module, a cable, a simple printed piece and a parts kit, as objects to be embedded, scanning the slice file of the composite printed piece by the data processing unit, and marking action labels on an initial layer of the objects to be embedded;

step 2b3c: generating, by the data processing unit, an instruction for controlling the multifunctional robot and the additive manufacture device, to assemble or place the objects to be embedded into a workpiece being printed; inserting an additive manufacturing device pause instruction, an additive manufacturing device pause time, a transportation and positioning instruction for the multifunctional robot, an assembly instruction for the multifunctional robot and a continued printing instruction for the additive manufacturing device at the marked action labels, respectively; defining the slice file of the composite printed piece with the instruction insertion completed as a preprocessed file; and step 2b3d: converting the preprocessed file into a task sequence of the composite printed piece by the data processing unit.

3. The space assembly system according to claim 1, wherein:

the digital twin subsystem comprises a human-computer interaction interface and a three-dimensional simulation environment, the physical subsystem is detected and sensed by the imaging and positioning device, and a target is extracted from the physical subsystem to generate a virtual digital model, wherein the virtual digital model comprises geometric and structural information;

physical parameters of the target, comprising heat distribution, electromagnetic field distribution, centroid and moment of inertia, are obtained by the sensor unit;

the physical parameters are added to the virtual digital model by the data processing unit to generate a digital twin of the target, and the digital twin is integrated into the three-dimensional simulation environment to display the digital twin in the three-dimensional simulation environment;

the communication subsystem is configured to perform a data synchronization to enable a one-to-one correspondence between the physical subsystem and the digital twin subsystem and to monitor the physical subsystem;

the human-computer interaction interface is configured to display files sent by the physical subsystem, comprising the log information, the component test report, and the finished product test report, and the ground or space operator sends an instruction by the human-computer interaction interface to control the physical subsystem; and the three-dimensional simulation environment is configured to visualize the digital twin of the physical subsystem, and the ground or space operator remotely monitors the physical subsystem by the three-dimensional simulation environment, remotely monitored content comprising device monitoring, operation and maintenance monitoring, task monitoring, energy monitoring, and production scheduling pre-determining, wherein:

the device monitoring is to monitor an operation state of each unit and device, and analyze and pre-determine the operation state of each unit and device in real time;

the operation and maintenance monitoring is to monitor a scheduling state of each unit and device, comprising a task sequence accumulation state and reason, and an idle state and reason of each unit and device;

the task monitoring is to monitor task sequence execution progress of each unit and device, and to monitor the task sequence execution progress of each unit and device in real time;

the energy monitoring is to monitor production consumption of the physical subsystem, and the production consumption comprises consumption of additive manufacturing consumables, consumption of spacecraft enabling modules, consumption of cables, consumption of parts kits, energy consumption, emission of pollutants, and a recycled quantity of unqualified components; and the production scheduling pre-determining is to pre-determine a capacity of the physical subsystem in a next unit time period according to data collected by the task monitoring, a time length of the unit time period is defined by the ground or space operator, and a type and quantity of raw materials needed in the next unit time period are generated.

4. The space assembly system according to claim 1, wherein:
the communication subsystem is configured to establish a connection between all units of the physical subsystem and a connection between the physical subsystem and the digital twin subsystem in at least one communication mode; and
the communication mode comprises topic communication, parameter server communication, and service communication, wherein:
the topic communication comprises a topic, a subscriber, and a publisher, wherein the publisher publishes the topic, the subscriber subscribes to the topic, and the topic communication is used in a data transmission scenario where continuous update and less logical processing are performed;
the parameter server communication comprises a parameter server, a parameter setter, and a parameter caller, wherein the parameter server is a public container configured to store and manage data, the parameter setter sets a parameter to the parameter server, the parameter caller obtains the parameter from the parameter server, and the parameter server communication is used in an application scenario where data sharing exists; and
the service communication is composed of a service, a server, and a client, wherein the client sends a service request to the server, the server provides the service to the client, and the service communication is used in an application scenario where there is a requirement for real-time performance and certain logical processing is performed.

5. The space assembly system according to claim 1, wherein an architecture of the communication subsystem is as follows:
a communication mode between the physical subsystem and the digital twin subsystem is service communication, the data processing unit is a server, the digital twin subsystem is a client, and a service is two-way information transmission between the digital twin subsystem and the physical subsystem;
a communication mode between the data processing unit and the control unit is parameter server communication, the data storage unit is a parameter server, the data processing unit is a parameter setter, and the control unit is a parameter caller;
a communication mode between the data processing unit and the sensor unit is parameter server communication, the data storage unit is a parameter server, the sensor unit is a parameter setter, and the data processing unit is a parameter caller;
a communication mode between the data processing unit and the imaging and positioning device is parameter server communication, the data storage unit is a parameter server, the imaging and positioning device is a parameter setter, and the data processing unit is a parameter caller;
a communication mode between the control unit and the additive manufacturing unit is topic communication, a topic is a printing task sequence of the additive manufacturing unit, the control unit is a publisher, and the additive manufacturing unit is a subscriber;
a communication mode between the control unit and the space robot unit is topic communication, a topic is an assembly task sequence, a transportation and positioning task sequence and a test task sequence, the control unit is a publisher, and the space robot unit is a subscriber;
a communication mode between the raw material bin and the data processing unit is parameter server communication, the data storage unit is a parameter server, the raw material bin is a parameter setter, and the data processing unit is a parameter caller; and
a communication mode between the space robot unit and the raw material bin is service communication, the raw material bin is a server, the space robot unit is a client, and a service is a raw material extracting service and a recycling service.

* * * * *